US012356207B2

(12) United States Patent
Kadam et al.

(10) Patent No.: US 12,356,207 B2
(45) Date of Patent: *Jul. 8, 2025

(54) TELECOMMUNICATION RESOURCE DEPLOYMENT USING MACHINE LEARNING SYSTEMS AND METHODS

(71) Applicant: T-Mobile USA, Inc., Bellevue, WA (US)

(72) Inventors: Salil Kadam, Bellevue, WA (US); Devanand Sharma, Bothell, WA (US); James Hodgen, Houston, TX (US); Prasad Neelakandasharma, Bellevue, WA (US); Surya Badrinath, Bellevue, WA (US); Arun Vijayan Nair Vimalakumari Amma, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 414 days.

This patent is subject to a terminal disclaimer.

(21) Appl. No.: 17/863,284

(22) Filed: Jul. 12, 2022

(65) Prior Publication Data

US 2024/0022916 A1 Jan. 18, 2024

(51) Int. Cl.
*H04W 16/18* (2009.01)
*G06F 3/04847* (2022.01)
(Continued)

(52) U.S. Cl.
CPC .......... *H04W 16/18* (2013.01); *G06F 40/289* (2020.01); *H04W 24/02* (2013.01); *G06F 3/04847* (2013.01); *G06F 3/0486* (2013.01)

(58) Field of Classification Search
CPC .............................. H04W 16/18; H04W 24/02
See application file for complete search history.

(56) References Cited

U.S. PATENT DOCUMENTS

| 5,691,973 A | 11/1997 | Ramstroem et al. |
| H1894 H | 10/2000 | Fletcher et al. |

(Continued)

FOREIGN PATENT DOCUMENTS

| CN | 104066488 A | 9/2014 |
| CN | 106902512 A | 6/2017 |

(Continued)

OTHER PUBLICATIONS

Cleland-Huang, Jane, et al. "A machine learning approach for tracing regulatory codes to product specific requirements." Proceedings of the 32nd ACM/IEEE International Conference on Software Engineering—vol. 1.2010. (Year: 2010).

(Continued)

*Primary Examiner* — Melanie Jagannathan
(74) *Attorney, Agent, or Firm* — Perkins Coie LLP

(57) ABSTRACT

System and methods for generating a deployment that uses existing telecommunication resources, such as microservices, data sources, and/or communication channels. The deployment can comprise a digital representation of a base station deployment. A plain language message is received that describes a desired deployment of telecommunication resources. One or more entities are extracted from the plain language message. Based on the extracted entities, the system recommends one or more existing telecommunication resources for use in the desired deployment. In some implementations, recommendations are generated using a machine learning model that generates relevance scores for each of multiple existing telecommunication resources. A selection is received from among the recommended telecommunication resources, and the desired deployment is generated using the selected telecommunication resources.

20 Claims, 6 Drawing Sheets

(51) Int. Cl.
    *G06F 3/0486*    (2013.01)
    *G06F 40/289*    (2020.01)
    *H04W 24/02*     (2009.01)

(56)              References Cited

U.S. PATENT DOCUMENTS

| | | | |
|---|---|---|---|
| 6,259,448 | B1 | 7/2001 | Mcnally et al. |
| 6,393,305 | B1 | 5/2002 | Ulvinen et al. |
| 7,290,244 | B2 | 10/2007 | Peck et al. |
| 7,487,493 | B1 | 2/2009 | Faulkner |
| 8,306,839 | B2 | 11/2012 | Deich et al. |
| 8,336,026 | B2 | 12/2012 | Chaar et al. |
| 8,341,155 | B2 | 12/2012 | Lane |
| 8,392,873 | B2 | 3/2013 | Agrawal et al. |
| 8,814,674 | B2 | 8/2014 | Derome et al. |
| 9,038,015 | B1 | 5/2015 | Allsbrook |
| 9,308,456 | B2 | 4/2016 | Derome et al. |
| 9,565,074 | B2 | 2/2017 | Lehane et al. |
| 9,721,216 | B2 | 8/2017 | Lane et al. |
| 9,830,765 | B2 | 11/2017 | Derome et al. |
| 9,893,959 | B1 | 2/2018 | Duet et al. |
| 9,912,607 | B2 | 3/2018 | Steinder et al. |
| 10,282,494 | B2 | 5/2019 | Mardikar et al. |
| 10,304,014 | B2 | 5/2019 | Garza et al. |
| 10,353,674 | B2 | 7/2019 | Barday |
| 10,387,167 | B2 | 8/2019 | Ramos Da Rocha et al. |
| 10,417,578 | B2 | 9/2019 | Jat et al. |
| 10,489,215 | B1 | 11/2019 | Wen et al. |
| 10,510,088 | B2 | 12/2019 | Jones-mcfadden et al. |
| 10,693,739 | B1* | 6/2020 | Naseri .................. G06F 16/29 |
| 10,802,886 | B1 | 10/2020 | Castinado et al. |
| 10,990,370 | B1 | 4/2021 | Bawcom |
| 11,256,484 | B2 | 2/2022 | Nikumb et al. |
| 11,347,488 | B2 | 5/2022 | Guo et al. |
| 11,405,329 | B1 | 8/2022 | Cuthbert et al. |
| 11,481,257 | B2 | 10/2022 | Sharma et al. |
| 11,526,349 | B2 | 12/2022 | Russell et al. |
| 12,039,301 | B2 | 7/2024 | Kerins et al. |
| 2004/0139176 | A1 | 7/2004 | Farrell et al. |
| 2007/0077903 | A1 | 4/2007 | Hassan et al. |
| 2008/0148231 | A1 | 6/2008 | Weber |
| 2010/0022263 | A1* | 1/2010 | Stamoulis ............ H04W 24/02 |
| | | | 455/501 |
| 2011/0119223 | A1 | 5/2011 | Lane |
| 2012/0047081 | A1 | 2/2012 | Bajpai et al. |
| 2015/0268935 | A1 | 9/2015 | Muntes et al. |
| 2016/0253156 | A1 | 9/2016 | Sripathan et al. |
| 2018/0046338 | A1 | 2/2018 | Breakstone et al. |
| 2019/0050205 | A1 | 2/2019 | Barday |
| 2019/0362096 | A1 | 11/2019 | Barday |
| 2020/0012962 | A1 | 1/2020 | Dent et al. |
| 2020/0117427 | A1 | 4/2020 | Mcgloin et al. |
| 2020/0174760 | A1 | 6/2020 | Fuchs |
| 2020/0252809 | A1* | 8/2020 | Patil .................... H04W 24/08 |
| 2021/0234930 | A1 | 7/2021 | Dinh et al. |
| 2021/0240448 | A1 | 8/2021 | Kuroda et al. |
| 2021/0258265 | A1 | 8/2021 | Guim Bernat et al. |
| 2021/0263710 | A1* | 8/2021 | Dhillon ............ G06Q 10/06315 |
| 2021/0320751 | A1* | 10/2021 | Gao .................... H04L 1/0068 |
| 2021/0337400 | A1 | 10/2021 | Jat et al. |
| 2021/0357805 | A1 | 11/2021 | Karim et al. |
| 2021/0367701 | A1* | 11/2021 | Chakraborty ......... H04L 1/0046 |
| 2021/0397418 | A1 | 12/2021 | Nikumb et al. |
| 2021/0405976 | A1 | 12/2021 | Gaitonde et al. |
| 2021/0406685 | A1 | 12/2021 | Carmody et al. |
| 2022/0014946 | A1 | 1/2022 | Merwaday et al. |
| 2022/0058569 | A1 | 2/2022 | Cella et al. |
| 2022/0131900 | A1 | 4/2022 | Karin et al. |
| 2022/0253443 | A1 | 8/2022 | Gold et al. |
| 2022/0256364 | A1 | 8/2022 | Jat et al. |
| 2022/0264425 | A1* | 8/2022 | Epstein ................... H04B 3/54 |
| 2022/0283787 | A1 | 9/2022 | Tang et al. |
| 2022/0305735 | A1 | 9/2022 | Cella et al. |
| 2022/0345863 | A1* | 10/2022 | Mueck ................... H04W 4/50 |
| 2022/0366459 | A1 | 11/2022 | Vieyra |
| 2023/0168929 | A1 | 6/2023 | Wadekar et al. |
| 2023/0236802 | A1 | 7/2023 | Raju et al. |
| 2023/0344680 | A1* | 10/2023 | Akoum ................ H04B 7/0617 |
| 2024/0020095 | A1 | 1/2024 | Kadam et al. |
| 2024/0023028 | A1* | 1/2024 | Nikopour ............... G06N 3/045 |
| 2024/0095029 | A1 | 3/2024 | Rowlands et al. |
| 2024/0230826 | A1 | 7/2024 | Dwivedi et al. |

FOREIGN PATENT DOCUMENTS

| | | |
|---|---|---|
| CN | 104548600 B | 10/2018 |
| DE | 102022101068 A1 | 7/2022 |
| EP | 1074974 A2 | 2/2001 |
| EP | 1116387 A1 | 7/2001 |
| EP | 1123620 A1 | 8/2001 |
| EP | 1151377 A1 | 11/2001 |
| EP | 1162813 A2 | 12/2001 |
| EP | 1187005 A2 | 3/2002 |
| EP | 1342156 A2 | 9/2003 |
| EP | 0769169 B1 | 9/2004 |
| EP | 1702263 A2 | 9/2006 |
| EP | 1889161 A2 | 2/2008 |
| EP | 2050029 A1 | 4/2009 |
| EP | 2473919 A1 | 7/2012 |
| EP | 2593917 A1 | 5/2013 |
| EP | 2518941 B1 | 11/2013 |
| EP | 2816470 A1 | 12/2014 |
| EP | 3003518 A1 | 4/2016 |
| EP | 3011434 A1 | 4/2016 |
| EP | 3021521 A1 | 5/2016 |
| EP | 3069267 A1 | 9/2016 |
| EP | 2854973 B1 | 12/2016 |
| EP | 3234810 A1 | 10/2017 |
| EP | 3286670 A1 | 2/2018 |
| EP | 3032442 B1 | 12/2018 |
| EP | 3167945 B1 | 1/2020 |
| EP | 3826233 B1 | 10/2022 |
| JP | 2004535021 A | 11/2004 |
| JP | 2005524137 A | 8/2005 |
| JP | 4040411 B2 | 11/2007 |
| JP | 4498735 B2 | 4/2010 |
| JP | 4865979 B2 | 11/2011 |
| JP | 6034405 B2 | 11/2016 |
| JP | 2018125023 A | 8/2018 |
| JP | 2018525050 A | 9/2018 |
| JP | 6595598 B2 | 10/2019 |
| JP | 6618219 B2 | 11/2019 |
| JP | 6633816 B2 | 12/2019 |
| JP | 6660954 B2 | 2/2020 |
| JP | 6663030 B2 | 2/2020 |
| JP | 2021504829 A | 2/2021 |
| KR | 20010080210 A | 8/2001 |
| KR | 101600028 B1 | 3/2016 |
| KR | 20160059475 A | 5/2016 |
| KR | 101667668 B1 | 10/2016 |
| KR | 20180112008 A | 10/2018 |
| KR | 20210006513 A | 1/2021 |
| KR | 20210076882 A | 6/2021 |
| KR | 20210143944 A | 11/2021 |
| WO | 9120033 A1 | 12/1991 |
| WO | 0024192 A1 | 4/2000 |
| WO | 0184301 A2 | 11/2001 |
| WO | 0210962 A1 | 2/2002 |
| WO | 02084558 A1 | 10/2002 |
| WO | 2004021207 A1 | 3/2004 |
| WO | 2005065098 A2 | 7/2005 |
| WO | 2006121448 A1 | 11/2006 |
| WO | 2006132756 A2 | 12/2006 |
| WO | 2006135726 A2 | 12/2006 |
| WO | 2007116411 A1 | 10/2007 |
| WO | 2007129224 A2 | 11/2007 |
| WO | 2007130356 A2 | 11/2007 |
| WO | 2008015359 A1 | 2/2008 |
| WO | 2008071448 A1 | 6/2008 |
| WO | 2009025721 A1 | 2/2009 |
| WO | 2009112359 A1 | 9/2009 |
| WO | 2010139167 A1 | 12/2010 |
| WO | 2011025668 A1 | 3/2011 |
| WO | 2011025669 A1 | 3/2011 |

(56) References Cited

FOREIGN PATENT DOCUMENTS

| WO | 2011025670 A1 | 3/2011 |
|---|---|---|
| WO | 2012008847 A1 | 1/2012 |
| WO | 2013185166 A1 | 12/2013 |
| WO | 2013186616 A2 | 12/2013 |
| WO | 2014174518 A1 | 10/2014 |
| WO | 2015052373 A1 | 4/2015 |
| WO | 2015071777 A1 | 5/2015 |
| WO | 2016099317 A1 | 6/2016 |
| WO | 2016179149 A1 | 11/2016 |
| WO | 2017054450 A1 | 4/2017 |
| WO | 2017054452 A1 | 4/2017 |
| WO | 2017165457 A1 | 9/2017 |
| WO | 2017165940 A1 | 10/2017 |
| WO | 2018106968 A1 | 6/2018 |
| WO | 2018195120 A1 | 10/2018 |
| WO | 2018231641 A1 | 12/2018 |
| WO | 2020096639 A1 | 5/2020 |
| WO | 2020123993 A2 | 6/2020 |
| WO | 2020226979 A2 | 11/2020 |
| WO | 2021050382 A1 | 3/2021 |
| WO | 2021057825 A1 | 4/2021 |
| WO | 2021109593 A1 | 6/2021 |
| WO | 2021122675 A1 | 6/2021 |
| WO | 2021139881 A1 | 7/2021 |
| WO | 2022006135 A1 | 1/2022 |

OTHER PUBLICATIONS

Tsoukalas, Dimitrios , "An ontology-based approach for automatic specification, verification, and validation of software security requirements: Preliminary results.", 2021 IEEE 21st International Conference on Software Quality, Reliability and Security Companion (QRS-C). IEEE, 2021. (Year: 2021).

* cited by examiner

TELECOMMUNICATION RESOURCE DEPLOYMENT USING MACHINE LEARNING SYSTEMS AND METHODS

CROSS-REFERENCES TO RELATED APPLICATIONS

This application relates to the Applicant's following concurrently filed patent applications, the contents of which are hereby incorporated by reference in their entirety for all purposes: "GENERATING AND DEPLOYING SOFTWARE ARCHITECTURES USING TELECOMMUNICATION RESOURCES" (U.S. Pat. No. 11,811,681) and "IDENTIFYING STANDARDS-RELATED REQUIREMENTS FOR SOFTWARE ARCHITECTURES USING TELECOMMUNICATION RESOURCES" U.S. Pat. No. 12,164,887).

BACKGROUND

Organizations, such as telecommunications service providers, maintain or have access to a variety of technical and business resources. These resources can be physical and/or digital and can include, for example, products, data and data sources, software modules and applications, communication resources, and so forth. Physical resources can be associated with various data, such as data about physical resource inventories and configurations (e.g., configurations of computing hardware, network components, products, physical facilities, etc.). Digital resources and/or digital representations of physical resources can be stored or accessed in various ways, such as using local and/or cloud storage, including various databases.

BRIEF DESCRIPTION OF THE DRAWINGS

Detailed descriptions of implementations of the present invention will be described and explained through the use of the accompanying drawings.

Figure 1:
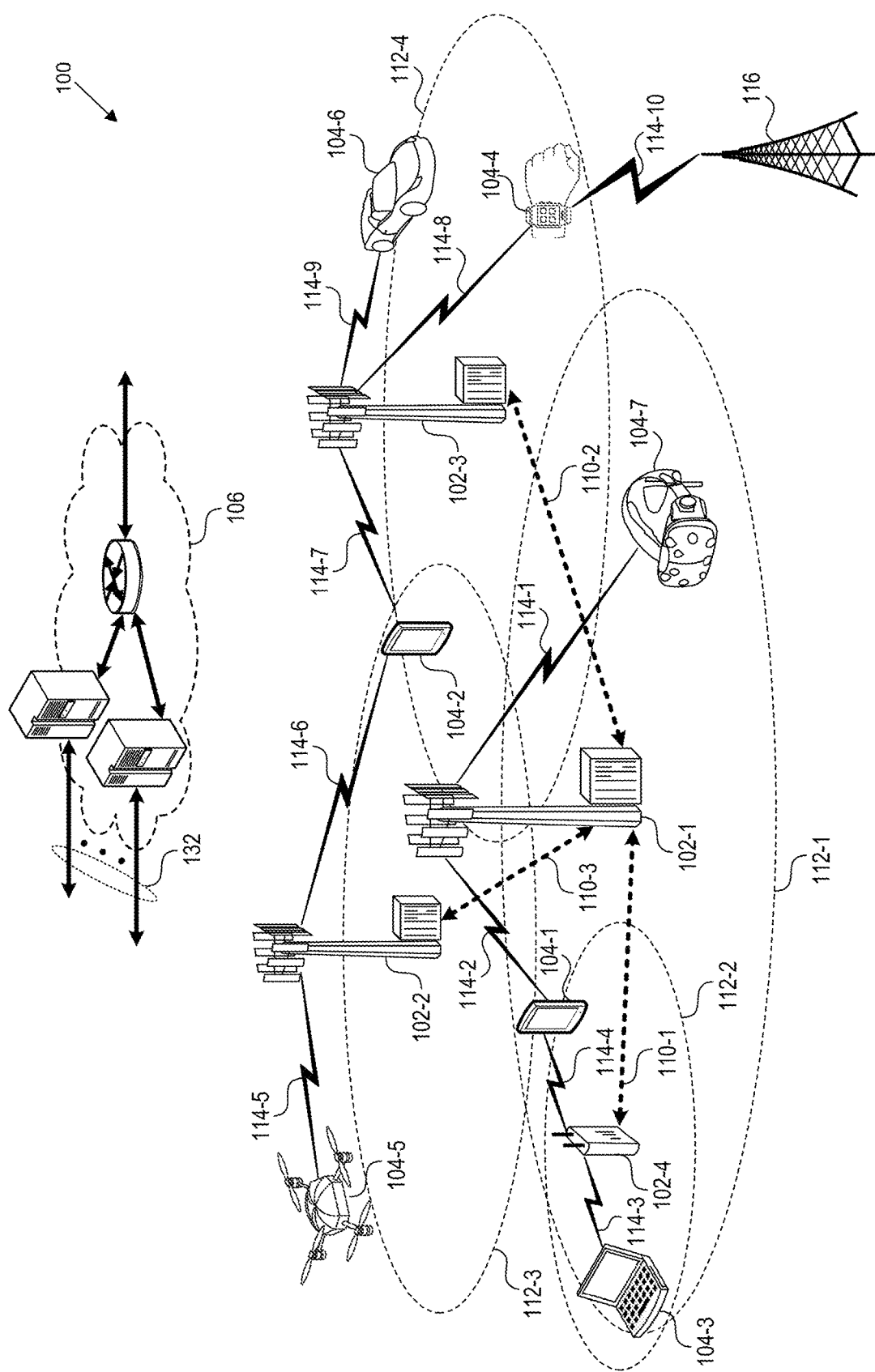
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunication service providers face difficult technical challenges related to maintaining telecommunication resources in such a way that the resources can be easily discovered and used or reused in new deployments. As used herein, the term "telecommunication resource" includes, but is not limited to, digital resources, such as one or more data sources and/or other data, computing or processing resources, software modules/code or applications (e.g., microservices), data resources (e.g., data processing tools or platforms, machine learning or artificial intelligence tools), digital communication channels, or digital assets. Additionally or alternatively, a telecommunication resource can include one or more physical resources, such as physical facilities, physical products, network and/or computing hardware, and/or various configurations of physical resources. In some implementations, a telecommunication resource can be a digital resource that represents or is associated with one or more physical resources. As used herein, a "deployment" comprises a set of telecommunication resources, such as digital resources that are aggregated to generate a software product, a digital representation of a hardware deployment (e.g., a base station deployment in a telecommunications network), a software-based process, a document or file, or any other aggregation of telecommunication resources to perform one or more functions.

A telecommunications service provider uses various deployments that include telecommunication resources. For example, a deployment can be a software product or a digital representation of a set of hardware resources. The telecommunications service provider stores, maintains, and/or acquires various telecommunication resources used in these deployments and/or other activities of the telecommunications service provider. Software products developed or used by the telecommunications service provider can each include or be associated with telecommunication resources such as software modules (e.g., microservices) and data or data sources accessed by the software products. The telecommunications service provider also operates one or more telecommunications networks comprising various hardware and/or software components, and the telecommunications service provider maintains telecommunication resources related to inventories and/or configurations of the network components (e.g., base station or cell site configurations, hardware inventories and locations, etc.). Additionally or alternatively, the telecommunications service provider develops and maintains various data sources, such as those related to subscribers, employees, contractors, and other individuals/entities associated with the telecommunications service provider. These and other deployments and associated telecommunication resources are typically stored in various formats, such as databases, spreadsheets, document files (e.g., portable document format (PDF) files, word processor files), or other standardized or non-standardized data, which may not be centrally accessible to all users and/or telecommunication resources that have a need to use the telecommunication resources. For example, a software developer associated with the telecommunications service provider typically lacks ready access to all software modules of the telecommunications service provider in a format that allows for quick identification and redeployment of a module that is relevant to a new/modified software product. Other users face similar technical challenges related to identification of telecommunication resources for use in new/updated deployments. This lack of ready and central access to telecommunication resources causes inefficient use of existing resources and may result in unnecessary duplication of resources. For example, a software developer may design and create a new software module to perform a function for which a previously developed software module already exists because the software developer does not have access/visibility into all of the software modules associated with the telecommunications service provider. As a further example, some telecommunication resources lack access to other telecommunication resources, such as when software modules cannot readily consume data from certain data sources (e.g., because the data sources are non-standardized or use in incompatible format).

Accordingly, there is a need for a technical solution that overcomes the foregoing technical problems and provides other benefits. For example, there is a need for a solution that catalogues various kinds of existing telecommunication resources using metadata such that the existing telecommunication resources can be readily identified. Additionally, there is a need for a solution that identifies existing telecommunication resources for inclusion in new deployments based on relevance scores generated in response to natural language messages. Furthermore, there is a need for a technical solution that provides actionable insights related to deployments of telecommunication resources, such as recommendations and/or deployments generated using machine learning and/or artificial intelligence.

Disclosed herein are systems and related methods for deployment of telecommunication resources ("system" or "telecommunication resource deployment system"). The system receives one or more natural language messages that include a description of a desired deployment using telecommunication resources. The system extracts one or more entities from each of the natural language messages, such as a keyword or phrase. Using the extracted entities and a machine learning model, the system identifies existing telecommunication resources to recommend for inclusion in the desired deployment. The existing telecommunication resources can be one or more of a data source, a microservice, a digital communication channel, and so on. Identifying the existing telecommunication resources includes generating, using the machine learning model and for each of multiple existing telecommunication resources, at least one relevance score reflecting a relevance of the existing telecommunication resource based on the extracted entities, and recommending a telecommunication resource based on a comparison to a threshold relevance score. The multiple existing telecommunication resources can include at least one data source that is represented as a data object. The system receives a selection of at least one of the recommended telecommunication resources to be included in the desired deployment, and the system generates the deployment of telecommunication resources using the selected at least one telecommunication resource.

To enable new deployments of telecommunication resources, the system catalogues various existing telecommunication resources and existing deployments of telecommunication resources that are accessible by the system. As described herein above, these existing telecommunication resources can comprise one or more data sources (e.g., represented as data objects), software modules or applications (e.g., microservices), and/or digital communication channels. Existing deployments of telecommunication resources can comprise, for example, software products or related specifications, digital representations of hardware deployments (e.g., base stations or cell sites), software-based processes, and so forth. The system identifies and retrieves access credentials for existing telecommunication resources. The access credentials can be usernames or other identifiers, passwords or PINS (e.g., encrypted secret PINs and/or passwords), IMEIs, phone numbers, and so forth, which are provided in a configuration file. The access credentials can be associated with resource location information, such as a uniform resource locator (URL) or an endpoint or other location where the telecommunication resource can be accessed. The system identifies a driver that can be used to access the telecommunication resource. Using the driver, the resource location information, and the access credentials, the system accesses the identified resource and ingests data and/or metadata associated with the resource. For example, if the resource is a data source, then the system ingests data from the data source and creates data objects using the ingested data and metadata associated with the data source. If the telecommunication resource is a microservice then the system identifies an endpoint (e.g., API endpoints, such as for a RESTful API) where the system can access the microservice and data and/or metadata associated with the microservice. If the telecommunication resource is a communication channel, such as an email account or other messaging account, then the system identifies information associated with the communication channel, such as supported communication types (e.g., sending/receiving text messages, emails, short message service (SMS) messages, rich communication service (RCS) messages, etc.), contacts, and so forth. The foregoing telecommunication resources and other resources are catalogued by the system, including metadata associated with each resource. The metadata includes information about deployments that use the telecommunication resource, which can be existing software products or specifications, processes, digital representations of hardware deployments, and so forth. Additionally or alternatively, the metadata can include information (e.g., keywords or phrases and/or relevance scores) related to content and/or data included in or associated with a telecommunication resource, such as a topic or subject included in or related to the resource.

The disclosed system can include one or more machine learning models that are trained to identify existing telecommunication resources that are relevant to a new deployment in response to plain language messages. The one or more machine learning models can receive a training dataset comprising existing telecommunication resources that have been catalogued by the system, as described herein above, and metadata associated with each of the existing telecommunication resources. The metadata comprises at least keywords associated with the existing telecommunication resources, deployments in which the existing telecommunication resources are included, and metadata associated with the deployments. Using these training datasets, the one or more machine learning models are trained to receive inputs associated with a new deployment and generate relevance scores reflecting the relevance of each existing telecommunication resource to the new deployment. The inputs can be plain language messages, as described herein, and/or keywords generated using the plain language messages. Existing telecommunication resources are recommended for inclusion in a new deployment when a relevance score exceeds a threshold. In some implementations, the disclosed system includes one or more deep learning models and/or algorithms that are trained and/or configured to generate deployments with few interactions or no interactions with a human user.

Advantages of the disclosed technology include faster and more efficient development of new or modified deployments using existing resources. For example, the disclosed technology allows for easy access to and visibility of existing telecommunication resources based on contextual information associated with the resources such that these existing resources can be reused in new deployments. The disclosed technology further saves resources (e.g., technical resources, financial resources, human resources) that would otherwise need to be used to identify existing resources and/or plan for new resources or deployments. And the disclosed technology allows for new and/or modified deployments (e.g., software products) to be deployed and/or brought to market more quickly because the deployments are generated, at least in part, using existing telecommunication resources that are quickly identified by the disclosed technology for inclusion in the deployments. Additionally, the disclosed technology allows users to aggregate various telecommunication resources without having to write complex code or technical requests to access each resource. Instead, the system allows users to enter plain language messages and add telecommunication resources to a deployment with user-friendly interfaces, such as interfaces that dynamically recommend existing telecommunication resources and allow users to drag and drop selected resources to be included in a deployment. Furthermore, in some implementations, the disclosed system generates deployments (e.g., software deployments) that are hardware-independent. In other words, software deployments can be generated without regard to specific hardware infrastructure on which the software is deployed, such as by using and/or generating YAML files and/or bootstrap files related to configurations for the software deployment. This allows for flexible deployments using various environments and/or hardware infrastructure.

For purposes of illustration, examples herein describe using the disclosed system to generate a deployment of telecommunication resources comprising a digital representation of hardware components (e.g., a base station in a telecommunications network). However, a person skilled in the art will understand that the present technology can be applied in any situation where existing resources are used in new deployments. Additionally, although specific examples are described herein with reference to deployments of telecommunication resources, a person skilled in the art will understand that the disclosed system can be used in various environments where physical and/or digital resources are deployed, such as for deployments related to information technology (IT), mechanical systems or mechatronics, software development, project management, human resources, transportation, organizational management, and so forth.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Suitable Environments

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Telecommunication Resource Deployment System

Figure 2:
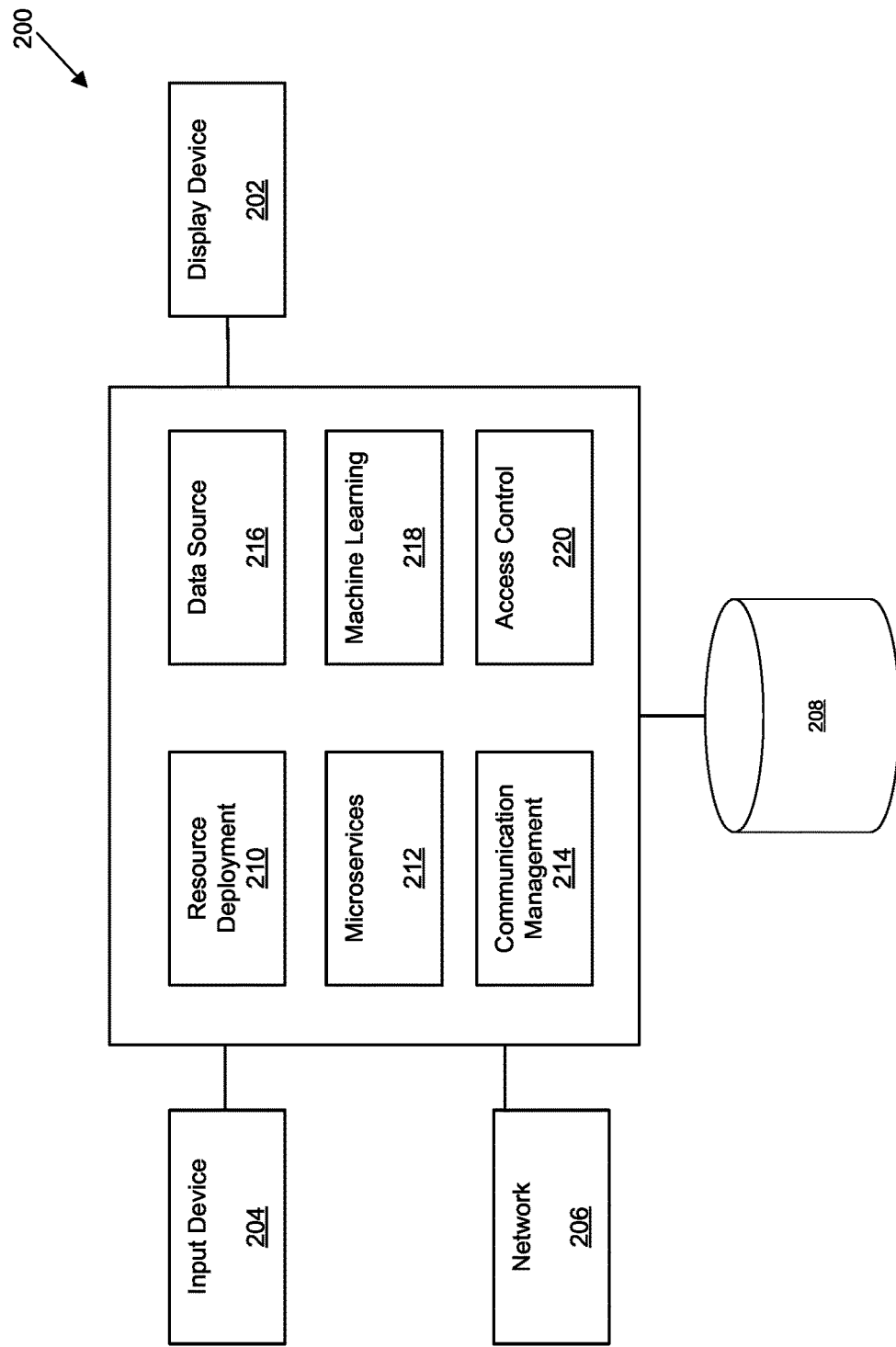
FIG. 2 is a block diagram that illustrates components of a telecommunication resource deployment system in some implementations.

FIG. 2 is a block diagram that illustrates components of a telecommunication resource deployment system 200 that generates deployments of telecommunication resources based on natural language messages received from a user, in some implementations. All or portions of the system 200 can be provided, for example, by a telecommunications service provider that provides all or portions of the network 100 using one or more components or functions of the network 100. The telecommunication resource deployment system 200 can include functional modules that are implemented with a combination of software (e.g., executable instructions or computer code) and hardware (e.g., one or more memories and one or more processors). Accordingly, as used herein, in some examples a module is a processor-implemented module or set of code and represents a computing device having one or more processors that are at least temporarily configured and/or programmed by executable instructions carried in one or more memories to perform one or more of the functions described herein.

The telecommunication resource deployment system 200 includes a display device 202, an input device 204, a network component 206, and a storage component 208, which are described herein below. Additionally, the system 200 includes a resource deployment module 210, a microservices module 212, a communication management module 214, a data source module 216, a machine learning module 218, and an access control module 220, which are each discussed separately below.

The display device 202 can include any display device known in the art and is configured to display one or more interfaces and/or outputs of the system 200. In some implementations, other output devices can be used in addition to, or as an alternative to, the display device 202, such as audio output devices.

The input device 204 is configured to receive inputs, such as messages, from a user and can be any input device known in the art, such as a keyboard, mouse, touchscreen, trackball, and/or microphone, etc.

The network component 206 is configured to communicate with external devices or entities, such as devices via which external data sources, microservices, communication channels, or other resources are accessed by the system 200.

The storage component 208 comprises local storage, storage on a server system or on the cloud, or a combination thereof. The storage component 208 stores data for or used by the system 200, such as data related to deployments, microservices, data sources, communication channels, or other resources, and/or training datasets to train one or more machine learning models.

Resource Deployment Module

The resource deployment module 210 receives messages from users (e.g., via input device 204) that describe desired deployments including telecommunication resources, and the resource deployment module 210 generates deployments based on the received messages. The messages can be received at an interface and from a user. The messages can describe any deployment that requires the use of telecommunication resources, such as digital resources and/or physical resources associated with or represented by digital resources. The messages can be received as plain language messages, from which the resource deployment module 210 can extract one or more entities comprising keywords, metadata, category information, or other information associated with the received messages. The plain language messages can be received as text or converted to text, and can be phrased using ordinary human language (e.g., English), which can be processed by the system (e.g., using natural language processing (NLP)). The extracted entities can then be used, by the resource deployment module 210, to identify one or more existing telecommunication resources to be used in the deployment. The one or more existing telecommunication resources can be identified using machine learning models trained by the machine learning module 218. The identified existing telecommunication resources are displayed in the interface, where the user can select from the displayed resources for telecommunication resources to be included in the deployment. For example, the displayed existing telecommunication resources in the interface can be clicked and dragged by the user to a deployment region of the interface.

If the selected existing telecommunication resources allow for a complete deployment, then the resource deployment module 210 can generate the complete deployment using the selected existing telecommunication resources. If the selected existing telecommunication resources do not provide a compete deployment, then the system identifies additional telecommunication resources that will need to be provided or generated before a deployment is complete. For example, the resource deployment module 210 can use trained machine learning models to determine whether a set of selected existing telecommunication resources is sufficient for a complete deployment (e.g., based on patterns and/or comparisons for existing deployments). If the resource deployment module 210 determines that a set of selected existing telecommunication resources does not provide a complete deployment, then the resource deployment module 210 can recommend additional telecommunication resources to be included in the deployment.

In some implementations, the resource deployment module 210 is configured to generate deployments of base stations for networks provided by a telecommunications service provider. The resource deployment module 210 receives a message comprising a description of a desired base station. In some implementations, the resource deployment module 210 requests or receives one or more additional parameters associated with the desired base station. The resource deployment module 210 identifies one or more existing telecommunication resources to be included in the base station, comprising various components of base stations. The existing telecommunication resources can be displayed in a graphical user interface, and a user can select the telecommunication resources, for example, by dragging and dropping each resource to a target region of the interface.

Microservices Module

The microservices module 212 identifies and provides access to one or more microservices, which are one kind of telecommunication resource that can be deployed by the system 200. As used herein, "microservices" is a generalized term that includes one or more software modules, which may be at least a portion of a software application. Microservices typically relate to an architecture wherein various functions of an application are provided as a collection of loosely-coupled services, which can each be accessed as microservices, such as via a respective application program interface (API). The microservices module 212 can store/access information associated with various microservices and/or information about accessing microservices residing elsewhere, such as in the storage component 208 and/or accessed via the network component 206. If access credentials are required to access various microservices, then the microservices module 212 can store and/or access the credentials to access the microservices (e.g., by accessing a configuration file). The microservices module can also store metadata about each microservice, such as keyword or category information associated with each microservice, API endpoints, deployments that use each microservice, and so forth.

During operation, the microservices module 212 can be used by the resource deployment module 210 to access various microservices that can each be scored based on their relevance to a desired deployment described in messages received by the resource deployment module 210. The various microservices available via the microservices module 212 can be scored using the machine learning module 218. Microservices with a relevance score exceeding a threshold can be displayed in an interface generated by the resource deployment module 210 as recommended telecommunication resources to be included in the deployment. If a recommended microservice is selected by a user for inclusion in a deployment, then the microservices module 212 can provide access to the selected microservice for the deployment. Each microservice can be represented by a URL included in the deployment, which can be used to access the microservice. Additionally or alternatively, each microservice can have or be associated with a Swagger (Open API) definition, which can be a language-agnostic specification for describing REST APIs.

Communication Management Module

The communication management module 214 identifies and provides access to one or more communication channels, which are another kind of telecommunication resource that can be deployed by the system 200. Various kinds of communication channels can be available as telecommunication resources used by the system 200, such as email accounts, messaging services (e.g., text messages, instant messages, SMS messages, RCS messages, etc.), Slack channels, and so forth. In general, the disclosed system accesses and/or incorporates communication channels via APIs. Accordingly, the disclosed technology can generally use any communication channel that can be accessed via an API. Each communication channel can be associated with various data and/or metadata such as a username or other identifier (e.g., email address) associated with the communication channel, one or more categories of communications that can be sent and/or received via the communication channel, and deployments that include the communication channel.

During operation, the communication management module 214 can be used by the resource deployment module 210 to access various communication channels that can each be scored based on their relevance to a desired deployment described in messages received by the resource deployment module 210. The various communication channels available via the communication management module 214 can be scored using the machine learning module 218. Communication channels with a relevance score exceeding a threshold can be displayed in an interface generated by the resource deployment module 210 as recommended telecommunication resources to be included in the deployment. If a recommended communication channel is selected by a user for inclusion in a deployment, then the communication management module 214 can provide access to the selected communication channel for the deployment.

In some implementations, the disclosed technology can generate, access, and/or receive drivers for communication channels, such as by using data scraping (e.g., to provide and/or consume data from a communication channel without a full API).

Data Source Module

The data source module 216 provides access to one or more data sources, which are another kind of telecommunication resource that can be deployed by the system 200. For example, the data source module 216 can ingest data from the one or more data sources and convert the data from the one or more data sources into data objects that can be used by the system 200 when deploying telecommunication resources. The data sources and/or data objects generated from the data sources can be associated with various metadata, including deployments associated with the data sources and/or data objects. Additionally, the data source module 216 can store and/or access credentials for accessing the one or more data sources (e.g., using a configuration file). The data source module 216 can also discover and/or provide information related to various actions that can be performed using the data sources, such as calculations, data manipulations, reports, and so forth.

During operation, the data source module 216 can be used by the resource deployment module 210 to access various data sources that can each be scored based on their relevance to a desired deployment described in messages received by the resource deployment module 210. The various data sources available via the data source module 216 can be scored using the machine learning module 218. For example, the scores can be generated based on data objects representing each of the data sources. Data sources with a relevance score exceeding a threshold can be displayed in an interface generated by the resource deployment module 210 as recommended telecommunication resources to be included in the deployment. If a recommended data source is selected by a user for inclusion in a deployment, then the data source module 216 can provide access to the selected data source for the deployment.

Machine Learning Module

The machine learning module 218 provides and trains one or more machine learning models that can be used by the system 200 to recommend telecommunication resources for inclusion in a deployment, such as microservices provided using the microservices module 212, communication channels provided using the communication management module 214, and/or data sources provided using the data source module 216. For example, a machine learning model provided by the machine learning module 218 can receive entities extracted from a message received by the resource deployment module 210 that describe a desired deployment. The entities can be, for example, keywords, phrases, and/or category information associated with a deployment requested by a user. Using the extracted entities, the machine learning model can generate one or more relevance scores for each of multiple telecommunication resources, each relevance score reflecting a likelihood that the resource is relevant to the deployment. The relevance scores can be compared to a threshold and, based on this comparison, at least a portion of the telecommunication resources can be recommended to the user for inclusion in the deployment. The telecommunication resource recommendations are then provided by the machine learning module 218 to the resource deployment module 210, where the recommended telecommunication resources are displayed to the user.

The machine learning module 218 can train the machine learning models to generate relevance scores using one or more training datasets, each training dataset comprising telecommunication resources and/or deployments including telecommunication resources. The training datasets can include keywords and/or other metadata associated with the telecommunication resources and/or the deployments. In some implementations, the machine learning module 218 provides one or more rulesets that can be used in conjunction with the machine learning models, such as rules relating to how various telecommunication resources are used by the system 200.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the machine learning module 218 can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer,") one or more nodes can produce a value classifying the input that, once the model is trained, can be used to assess telecommunication resources that are likely to be relevant to a deployment, and so forth. In some implementations, such neural networks, known as deep neural networks, can have multiple layers of intermediate nodes with different configurations, can be a combination of models that receive different parts of the input and/or input from other parts of the deep neural network, or are convolutions partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new deployments and associated telecommunication resources.

Access Control Module

The access control module 220 provides and controls access to the system 200 and/or one or more telecommunication resources that can be accessed using the system 200. In some implementations, the access control module 220 uses role-based access control (RBAC) to restrict access to the system 200 to authorized users only. Additionally, the access control module 220 can be used to provide access to telecommunication resources, such as microservices accessed by the microservices module 212, communication channels accessed by the communication management module 214, and/or data sources accessed by the data source module 216. To provide access to the telecommunication resources, the access control module 220 can store and/or access one or more configuration files containing access credentials for the telecommunication resources and/or resource locations where the telecommunication resources can be accessed (e.g., URLs, endpoints, etc.). Additionally or alternatively, access credentials for a telecommunication resource can be provided by a user, such as using an interface where a username, password, and/or resource location can be entered. In some implementations, the access control module 220 uses one or more authentication or authorization services, such as services provided by Okta, Inc. of San Francisco, California.

Telecommunication Resource Ingestion

Figure 3:
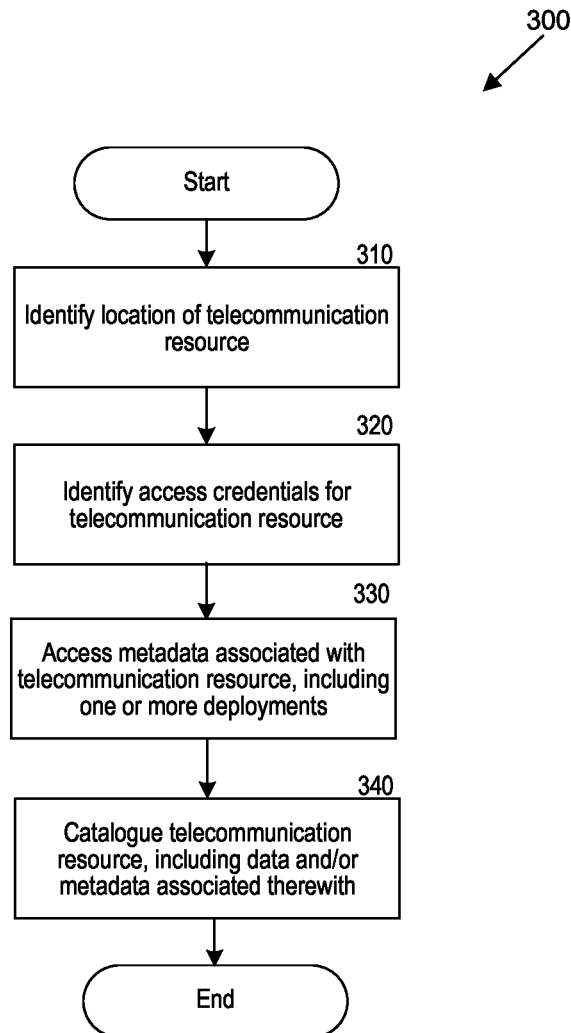
FIG. 3 is a flow diagram that illustrates a process for ingesting a telecommunication resource by a telecommunication resource deployment system in some implementations.

FIG. 3 is a flow diagram that illustrates a process 300 performed by a telecommunication resource deployment system, such as the system 200, to ingest a telecommunication resource accessible by the system, in some implementations. The telecommunication resource can be a microservice, a communication channel, or a data source. Thus, the process 300 can be performed, for example, by the microservices module 212, the communication management module 214, and/or the data source module 216, of FIG. 2. Additionally, the process 300 can require access controls, which can be provided using the access control module 220 of FIG. 2.

The process 300 begins at a block 310, where a location of the telecommunication resource is identified. The location can be, for example, an API endpoint and/or a URL where the resource can be accessed. The location can be specified in a configuration file and/or received from a user (e.g., via an interface).

The process 300 then proceeds to block 320, where access credentials are identified for the telecommunication resource. The access credentials can be, for example, a username or other identifier and/or a password. The access credentials can be provided in a configuration file and/or by a user (e.g., via an interface).

The process 300 then proceeds to block 330, where the telecommunication resource is accessed at the identified location and using the access credentials, and metadata associated with the telecommunication resource is accessed or identified, including at least one deployment in which the telecommunication resource is included.

The process 300 then proceeds to block 340, where the telecommunication resource is catalogued, including data and/or metadata associated with the telecommunication resource. Cataloguing the telecommunication resource can include generating one or more data objects representing the telecommunication resource and/or data or metadata in the telecommunication resource. Each data object comprises a collection of one or more data points that represents an entity (e.g., a telecommunication resource). Data objects can be represented in various data formats, such as XML, JSON, or CSV. For example, if the telecommunication resource is a data source, then data in the data source is ingested and one or more data objects are generated containing the data and metadata associated with the data source. In these and other implementations, the catalogued telecommunication resource is associated with various metadata about deployments that use the telecommunication resource and/or how the telecommunication resource is deployed. The catalogued telecommunication resource and its associated metadata are then available for discovery by the telecommunication resource deployment system for use in new deployments.

Telecommunication Resource Deployment

Figure 4A:
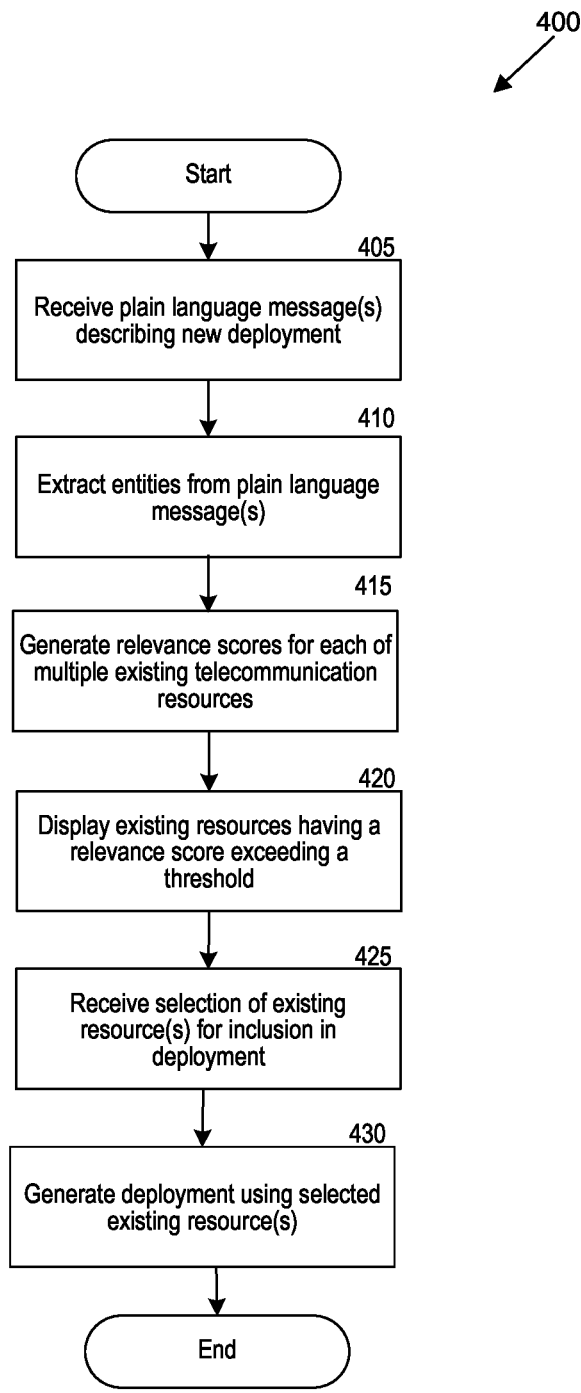
FIG. 4A is a flow diagram that illustrates a process for deploying telecommunication resources by a telecommunication resource deployment system in response to plain language messages in some implementations.

FIG. 4A is a flow diagram that illustrates a process 400 performed by a telecommunication resource deployment system, such as the system 200, to deploy telecommunication resources in response to plain language messages, in some implementations. For example, at least a portion of the process 400 can be performed by the resource deployment module 210 of the system 200, which identifies and deploys microservices available via the microservices module 212, communication channels available via the communication management module 214, and/or data sources available via the data source module 216 of FIG. 2. In some implementations, the system recommends telecommunication resources using one or more machine learning models provided by the machine learning module 218.

The process 400 begins at block 405, where one or more plain language messages are received describing a new deployment that requires deployment of one or more telecommunication resources. The one or more plain language messages can be received from a user via an interface generated by the system, such as interface 450 of FIG. 4B. As described herein, the deployment can comprise any combination of physical and/or digital resources. A deployment can be, for example, a software product comprising digital resources of software modules and/or associated data sources and/or communication channels. Additionally or alternatively, a deployment can be a configuration of hardware resources, which may be associated with and/or represented as digital resources. The received one or more plain language messages can describe a desired deployment and/or conditions associated with the desired deployment. In some implementations, the one or more plain language messages are each associated with different tiers or levels that describe the deployment, such as a first tier or level that broadly describes the deployment in conceptual terms followed by at least one other tier or level that describes further conditions of the deployment described in the first tier or level.

The process 400 then proceeds to block 410, where entities are extracted from each of the one or more plain language messages received at block 405. The entities can be, for example, keywords or phrases. In some implementations, the system uses a relational model to parse plain language messages, extract entities, and/or map entities based on metadata (e.g., associated telecommunication resources).

The process 400 then proceeds to block 415, where relevance scores are generated for each of multiple existing telecommunication resources. As described herein, the existing telecommunication resources can comprise, without limitation, microservices, data sources, communication channels, and/or digital representations of physical resources. The relevance scores can be generated using one or more machine learning models that receive the entities extracted at block 410 and output relevance scores for each of the existing telecommunication resources reflecting a likelihood that the existing telecommunication resource is relevant to the deployment described in the plain language message(s) received at block 405. The relevance score can be, for example, a numerical score.

The process 400 then proceeds to block 420, where the system displays, in the interface, existing resources for which the score generated at block 415 exceeds a threshold score. In some implementations, the system dynamically displays a list of existing resources as the user submits the one or more messages received at block 405. For example, the user can submit a first-level message generally describing a deployment, which causes existing resources to be displayed, and the displayed resources can dynamically update as the user submits additional messages describing further conditions or criteria associated with the deployment.

The process 400 then proceeds to block 425, where a selection of at least some of the displayed existing resources is received. A user selects the resources to be included in the deployment. The existing resources can be selected, for example, when a user drags a resource and drops it into a target region of the displayed interface. Receiving the selection can additionally or alternatively include, for example, detecting a user click on or near a displayed existing resource, detecting that a user has checked a box, receiving a selection from a drop-down menu, receiving a gesture-based control, and so forth.

The process 400 then proceeds to block 430, where the deployment is generated using the existing resources selected at block 425. Generating the deployment can comprise various actions, depending on the implementation of the system. Where the deployment includes a software product, generating the deployment can comprise aggregating code associated with selected microservices, data sources, and/or communication channels. Where the deployment includes a configuration of hardware resources, generating the deployment can comprise generating a digital representation of the each of the hardware resources and relationships between the hardware resources.

The process 400, thus, allows a user to generate functional deployments that can be readily tested and evaluated without requiring the user to generate code and/or manually generate new resources for inclusion in the deployment.

All or portions of processes 300 and 400 can be performed in any order, including performing one or more operations in parallel. Additionally, operations can be added, omitted, and/or repeated without deviating from the present disclosure. For example, a user can modify one or more messages received at block 405 and/or submitted additional messages to change the deployment, such as when the user wishes to change a deployment and/or when the existing resources displayed at block 420 are unexpected or irrelevant. Additionally, in some implementations, the process 400 can include receiving a name or other unique identifier for a deployment.

In some implementations, the system can determine that one or more resources required for a deployment is not available and, thus, the user must generate or provide the missing one or more resources before a deployment can be generated. For example, the system can compare a generated deployment to a historical archive of deployments and determine, based on the comparison, that additional telecommunication resources are needed for the new deployment. The system can further identify the additional telecommunication resources and notify a user of the needed telecommunication resources to complete the deployment.

Figure 4B:
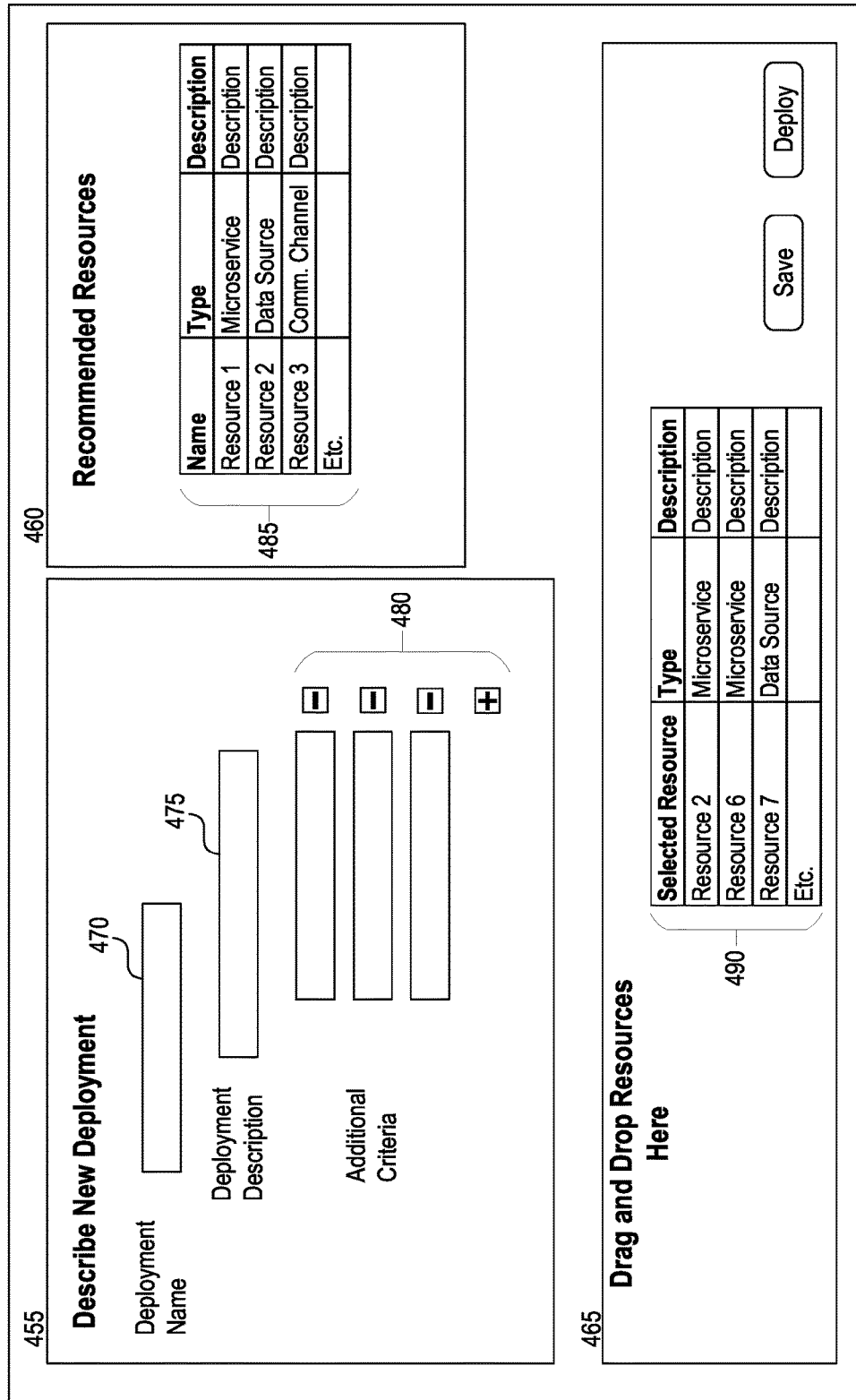
FIG. 4B is a block diagram that illustrates an interface generated by a telecommunication resource deployment system to deploy telecommunication resources in response to plain language messages in some implementations.

FIG. 4B is a block diagram that illustrates an interface 450 generated by the system to deploy resources in response to plain language messages, in some implementations. The interface 450 comprises an input region 455 for receiving inputs, a recommendation region 460, and a deployment region 465, which are each described below.

The input region 455 includes a name field 470, where a user enters a name or other identifier for a new deployment. The name can be a unique character string by which the deployment is identified. Additionally, the input region 455 includes fields 475 and 480. Although depicted as text input fields, the fields 475 and/or 480 can additionally or alternatively comprise any combination of input fields, such as drop-down menus, selectable fields, and so forth. Field 475 receives an input from a user that generally describes a deployment that a user wishes to generate using the interface 450. The input received at field 475 can be, for example, a plain language message from a user. In some implementations, the input received at field 475 can be a selection from a predefined list (e.g., of categories of deployments).

After the user submits the input at field 475, the user can optionally define additional criteria in one or more additional fields 480. The additional criteria can further describe the deployment and/or conditions, requirements, or other criteria associated with the deployment.

As the user provides inputs at the fields 475 and/or 480 describing the deployment, the system identifies one or more existing telecommunication resources that are relevant to the deployment and begins dynamically displaying recommended resources 485 at the recommendation region 460. Any number of recommended resources 485 can be displayed, depending on the number of existing resources for which a relevance score exceeds a threshold, as described herein. The recommended resources 485 are displayed based on recommendations generated using one or more machine learning models. Display of the recommended resources 485 can optionally include additional information, such as a type or category of the recommended resource 485 (e.g., microservice, data source, or communication channel), and/or a description of each recommended resource (e.g., inputs/outputs, available data, services, and/or communication types, etc.). The recommended resources 485 are actionable such that a user can select from the recommended resources 485, and a selected recommended resource can thereby be added to the deployment.

In the depicted example, a user can select one or more recommended resources 485 from the recommendation region 460 by clicking and dragging the one or more recommended resources 485 to the deployment region 465. In response to receiving the selection of the one or more recommended resources 485, the selected one or more resources 490 are displayed in the deployment region 465. Although the depicted example illustrates selecting the selected resources 490 by clicking and dragging, resources can be selected in other ways, such as by clicking on or near a resource 485 and/or checking a box (not shown). Once resources have been selected for inclusion in a deployment, a user can generate and/or save the deployment.

Computing System

Figure 5:
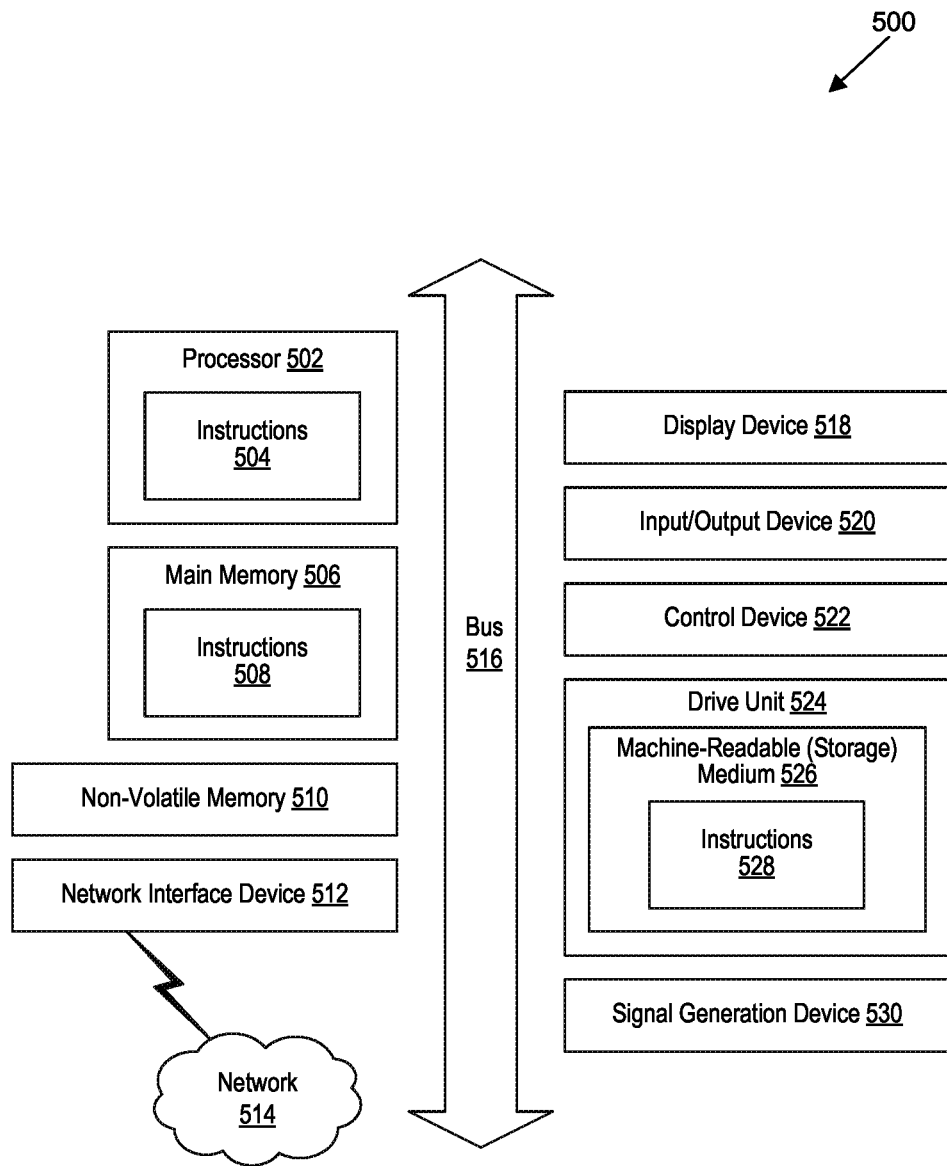
FIG. 5 is a block diagram that illustrates an example of a computing system in which at least some operations described herein can be implemented in some implementations.

FIG. 5 is a block diagram that illustrates an example of a computing system 500 in which at least some operations described herein can be implemented, in some implementations. As shown, the computing system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computing system 500 is intended to illustrate a hardware device on which components illustrated or described relative to the examples of the figures and any other components described in this specification can be implemented.

The computing system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computing system 500 can be an embedded computer system, a system-on-chip (SOC), a single-board computer system (SBC) or a distributed system such as a mesh of computer systems or include one or more cloud components in one or more networks. Where appropriate, one or more computing systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computing system for generating telecommunications base station deployments using existing resources, the computing system comprising:
at least one hardware processor;
at least one display; and
at least one non-transitory memory carrying instructions that, when executed by the at least one hardware processor, cause the computing system to perform operations to generate a digital representation of a telecommunications base station deployment, the operations comprising:
displaying, at the at least one display, a graphical user interface (GUI) comprising an input region and a recommendation region, wherein the input region of the GUI includes at least one input field;
receiving, via the at least one input field in the input region of the GUI, a plain language message that describes a telecommunications base station deployment,
wherein the telecommunications base station deployment comprises a set of hardware resources;
extracting, from the plain language message that describes the telecommunications base station deployment, at least one entity related to a characteristic of the telecommunications base station deployment,
wherein the at least one entity includes a keyword or phrase;
identifying, based on the extracted at least one entity and using a machine learning model, multiple recommended resources for the telecommunications base station deployment,
wherein at least some of the multiple recommended resources correspond to a hardware resource of the set of hardware resources, and
wherein the multiple recommended resources for the telecommunications base station deployment are identified based on comparing a relevance score generated by the machine learning model for each of multiple existing resources to a corresponding threshold relevance score;
dynamically displaying, at the recommendation region of the GUI, the multiple recommended resources for the telecommunications base station deployment;
receiving, via the GUI, a selection of one or more of the multiple recommended resources to be included in the telecommunications base station deployment; and
generating, by the computing system, a digital representation of the telecommunications base station deployment,
wherein the digital representation of the telecommunications base station deployment includes the selected one or more recommended resources.

2. The computing system of claim 1:
wherein the GUI further comprises a deployment region, and
wherein the selection of the one or more recommended resources is received by detecting that a user has dragged the one or more recommended resources to the deployment region.

3. The computing system of claim 1:
wherein the at least one input field of the GUI comprises a first input field to receive the plain language message and a second input field to receive an additional message,
wherein the second input field is displayed in response to receiving a command to add an input field, and
wherein the displayed multiple recommended resources dynamically update in response to receiving the additional message at the second input field.

4. The computing system of claim 1:
wherein the machine learning model is trained using a training dataset comprising multiple existing resources each associated with at least one existing deployment, and
wherein each of the multiple existing resources in the training dataset is associated with metadata.

5. The computing system of claim 1:
wherein the machine learning model is trained using a training dataset comprising multiple existing resources each associated with at least one existing deployment,
wherein each of the multiple existing resources in the training dataset is associated with metadata, and
wherein each of the multiple existing resources in the training dataset is represented by a data object that includes the metadata.

6. At least one computer-readable medium, excluding transitory signals, carrying instructions that, when executed by a computing system, cause the computing system to perform operations to generate a deployment using existing telecommunication resources, the operations comprising:
receiving a set of plain language messages that describes a desired deployment comprising multiple telecommunication resources;
extracting, from each plain language message in the set of plain language messages, at least one keyword or phrase related to a characteristic of the desired deployment;
accessing multiple existing telecommunication resources, wherein the multiple existing telecommunication resources comprise at least one of a data source, a microservice, or a communication channel, and
wherein each of the multiple existing telecommunication resources is associated with metadata related to an existing deployment that includes the existing telecommunication resource;
generating, by a trained machine learning model, a relevance score for each of the accessed multiple existing telecommunication resources,
wherein the relevance score reflects a likelihood that a corresponding existing telecommunication resource is relevant to the desired deployment;
recommending, based on the generated relevance scores, at least some of the multiple existing telecommunication resources for inclusion in the desired deployment;
receiving a selection of two or more telecommunication resources from the recommended at least some of the multiple existing telecommunication resources; and
generating, using the selected two or more telecommunication resources, a set of instructions intended to achieve the desired deployment.

7. The at least one computer-readable medium of claim 6, wherein the desired deployment includes a digital resource that represents a hardware resource associated with the desired deployment.

8. The at least one computer-readable medium of claim 6, wherein the set of plain language messages is received at an input region of a graphical user interface (GUI), the operations further comprising:
displaying the recommended at least some of the multiple existing telecommunication resources at a recommendation region of the GUI.

9. The at least one computer-readable medium of claim 6, the operations further comprising:
displaying the recommended at least some of the multiple existing telecommunication resources at a recommendation region of graphical user interface (GUI),
wherein receiving the selection of the two or more telecommunication resources from the recommended at least some of the multiple existing telecommunication resources includes detecting that a user has dragged the two or more telecommunication resources from the recommendation region of the GUI to a deployment region of the GUI.

10. The at least one computer-readable medium of claim 6, wherein at least some of the multiple existing telecommunication resources are accessed using data objects that each represent an existing telecommunication resource of the at least some of the multiple existing telecommunication resources.

11. The at least one computer-readable medium of claim 6:
wherein the desired deployment includes a software product comprising a set of microservices, and
wherein generating the set of instructions intended to achieve the desired deployment includes aggregating software code.

12. The at least one computer-readable medium of claim 6, wherein the operations further comprise:
identifying a need for at least one additional telecommunication resource for the desired deployment that is not included in the multiple existing telecommunication resources; and
generating a prompt to provide the needed at least one additional telecommunication resource.

13. The at least one computer-readable medium of claim 6, wherein accessing the multiple existing telecommunication resources includes:
accessing a data source included in the multiple existing telecommunication resources; and
generating at least one data object representation of the data source or data in the data source.

14. The at least one computer-readable medium of claim 6, wherein accessing the multiple existing telecommunication resources includes identifying access credentials and a location for at least a portion of the multiple existing telecommunication resources.

15. At least one computer-readable medium, excluding transitory signals, carrying instructions that, when executed by a computing system, cause the computing system to perform operations to generate a digital representation of a telecommunications base station deployment, the operations comprising:

displaying a graphical user interface (GUI) comprising an input region and a recommendation region,
  wherein the input region of the GUI includes at least one input field;
receiving, via the at least one input field in the input region of the GUI, a plain language message that describes a telecommunications base station deployment,
  wherein the telecommunications base station deployment comprises a set of hardware resources;
extracting, from the plain language message that describes the telecommunications base station deployment, at least one entity related to a characteristic of the telecommunications base station deployment, wherein the at least one entity includes a keyword or phrase;
identifying, based on the extracted at least one entity and using a machine learning model, multiple recommended resources for the telecommunications base station deployment,
  wherein at least some of the multiple recommended resources correspond to a hardware resource of the set of hardware resources, and
  wherein the multiple recommended resources for the telecommunications base station deployment are identified based on comparing a relevance score generated by the machine learning model for each of multiple existing resources to a corresponding threshold relevance score;
dynamically displaying, at the recommendation region of the GUI, the multiple recommended resources for the telecommunications base station deployment;
receiving, via the GUI, a selection of one or more of the multiple recommended resources to be included in the telecommunications base station deployment; and
generating, by the computing system, a digital representation of the telecommunications base station deployment,
  wherein the digital representation of the telecommunications base station deployment includes the selected one or more recommended resources.

16. The at least one computer-readable medium of claim 15:
  wherein the GUI further comprises a deployment region, and
  wherein the selection of the one or more recommended resources is received by detecting that a user has dragged the one or more recommended resources to the deployment region.

17. The at least one computer-readable medium of claim 15:
  wherein the at least one input field of the GUI comprises a first input field to receive the plain language message and a second input field to receive an additional message,
  wherein the second input field is displayed in response to receiving a command to add an input field, and
  wherein the displayed multiple recommended resources dynamically update in response to receiving the additional message at the second input field.

18. The at least one computer-readable medium of claim 15:
  wherein the machine learning model is trained using a training dataset comprising multiple existing resources each associated with at least one existing deployment, and
  wherein each of the multiple existing resources in the training dataset is associated with metadata.

19. The at least one computer-readable medium of claim 15:
  wherein the machine learning model is trained using a training dataset comprising multiple existing resources each associated with at least one existing deployment,
  wherein each of the multiple existing resources in the training dataset is associated with metadata, and
  wherein each of the multiple existing resources in the training dataset is represented by a data object that includes the metadata.

20. The at least one computer-readable medium of claim 15 wherein the telecommunications base station deployment is for a gNodeB.

* * * * *